United States Patent
Oraby

(10) Patent No.: US 8,387,743 B2
(45) Date of Patent: Mar. 5, 2013

(54) SYSTEMS AND METHODS FOR ACOUSTICALLY MEASURING BULK DENSITY

(75) Inventor: Moustafa E. Oraby, Cairo (EG)

(73) Assignee: Halliburton Energy Services, Inc. ("HESI"), Houston, TX (US)

( * ) Notice: Subject to any disclaimer, the term of this patent is extended or adjusted under 35 U.S.C. 154(b) by 0 days.

(21) Appl. No.: 13/003,609

(22) PCT Filed: Jun. 2, 2009

(86) PCT No.: PCT/US2009/046018
§ 371 (c)(1), (2), (4) Date: Jan. 11, 2011

(87) PCT Pub. No.: WO2010/141014
PCT Pub. Date: Dec. 9, 2010

(65) Prior Publication Data
US 2011/0284314 A1  Nov. 24, 2011

(51) Int. Cl.
*G01V 1/40* (2006.01)
(52) U.S. Cl. .................. 181/105; 73/152.46
(58) Field of Classification Search .......... 181/105; 73/152.46
See application file for complete search history.

(56) References Cited

U.S. PATENT DOCUMENTS

| 4,918,669 | A | 4/1990 | Chemali et al. |
| 5,265,016 | A | 11/1993 | Hanson et al. |
| 6,351,991 | B1 | 3/2002 | Sinha |
| 6,456,566 | B1 * | 9/2002 | Aronstam .......... 367/86 |
| 6,564,883 | B2 | 5/2003 | Fredericks et al. |
| 6,600,321 | B2 | 7/2003 | Evans |
| 6,678,616 | B1 | 1/2004 | Winkler et al. |
| 6,868,036 | B2 | 3/2005 | Wang et al. |
| 6,909,666 | B2 | 6/2005 | Dubinsky et al. |
| 6,957,700 | B2 | 10/2005 | Mandal |
| 7,098,664 | B2 | 8/2006 | Bittar et al. |
| 7,099,810 | B2 | 8/2006 | Mandal |
| 7,272,504 | B2 | 9/2007 | Akimov et al. |
| 7,414,918 | B2 * | 8/2008 | Hurst et al. .......... 367/35 |
| 7,460,435 | B2 * | 12/2008 | Garcia-Osuna et al. .... 367/25 |
| 7,522,471 | B2 * | 4/2009 | Froelich et al. .......... 367/35 |
| 2002/0116128 | A1 | 8/2002 | Sinha et al. |
| 2005/0006090 | A1 | 1/2005 | Chemali et al. |
| 2005/0078555 | A1 | 4/2005 | Tang et al. |

(Continued)

OTHER PUBLICATIONS

Willis, Mark E., et al., "Automatic P and S Velocity Determination from Full Waveform Digital Acoustic Logs", Geophysics, vol. 48 No. 12, Dec. 1983, pp. 1631-1644.

(Continued)

*Primary Examiner* — Forrest M Phillips
(74) *Attorney, Agent, or Firm* — Krueger Iselin LLP; Benjamin Fite

(57) ABSTRACT

Formation density is calculated from acoustic logging measurements. This technique does not require a radioactive source and in fact it may offer better precision particularly in rugose boreholes. In at least some embodiments, the technique exploits an observed relationship between a transmission coefficient $T(p_b, V_c, p_m V_m)$ and a breakdown resistance $\mu B(p_b, V_c, V_s)$ to enable determination of the formation density pb from measurements of the formation's compressional wave velocity $V_c$, the formation's shear wave velocity Vs, and the borehole fluid's acoustic impedance $p_m V_m$. The desired measurements can be acquired by attaching or integrating a fluid cell with an acoustic logging tool that measures acoustic wave propagation velocities. Real-time density logs can be obtained from both wireline and logging-while-drilling implementations.

18 Claims, 5 Drawing Sheets

U.S. PATENT DOCUMENTS

| | | |
|---|---|---|
| 2006/0198242 A1 | 9/2006 | Geerits et al. |
| 2010/0020638 A1 | 1/2010 | Mickael et al. |

OTHER PUBLICATIONS

Heysse, Dale R., et al., "Field Tests of an Acoustic Logging-While Drilling Tool in Various Borehole Environments", SPWLA 37th Annual Logging Symposium, Jun. 16-19, 1996, pp. 1-11.

PCT International Search Report and Written Opinion, dated Jul. 20, 2009, Appl No. PCT/US09/04618, "System and Method for Acoustically Measuring Bulk Density", filed Jun. 2, 2009, 6 pgs.

PCT International Search Report and Written Opinion, dated Nov. 2, 2010, Appl No. PCT/US10/49751, "Micro-Sonic Density Imaging While Drilling Systems and Methods", filed Sep. 22, 2010, 6 pgs.

\* cited by examiner

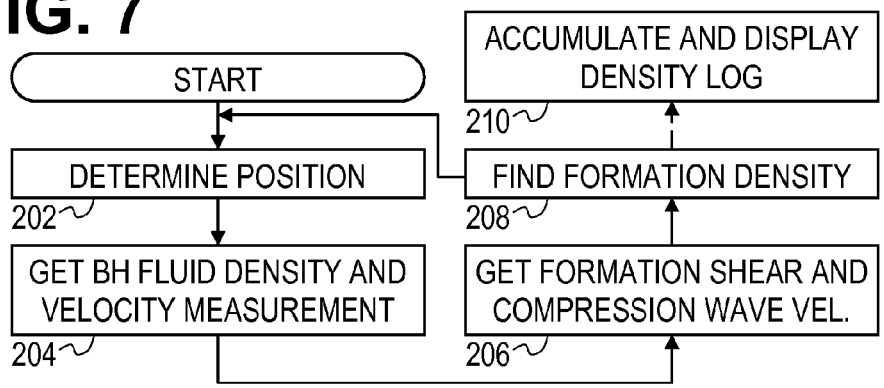
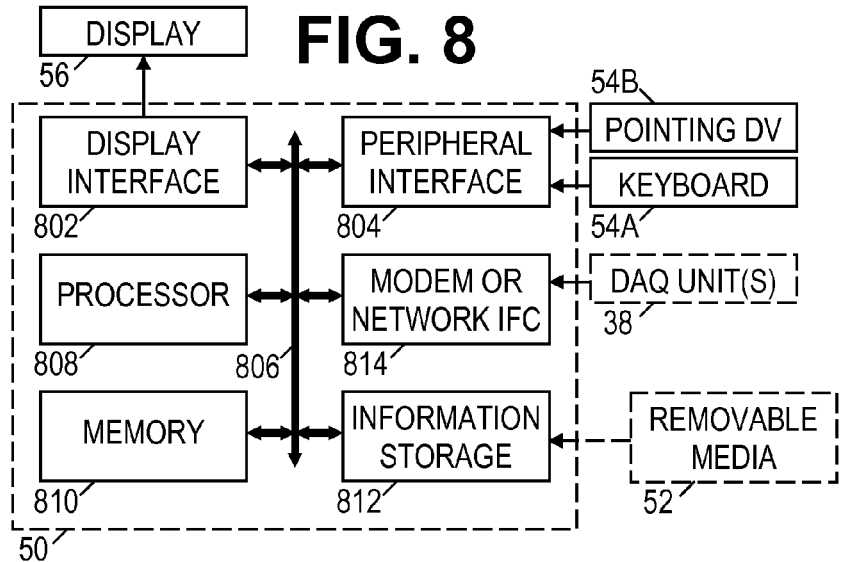

US 8,387,743 B2

SYSTEMS AND METHODS FOR ACOUSTICALLY MEASURING BULK DENSITY

BACKGROUND

In the quest for hydrocarbon reservoirs, companies employ many data-gathering techniques. The most detailed, albeit localized, data comes from well logging. During the well-drilling process, or shortly thereafter, driller pass logging instruments through the well bore to collect information about the surrounding formations. The information is traditionally collected in "log" form, i.e., a table, chart or graph of measured data values as a function of instrument position. The most sought-after information relates to the location and accessibility of hydrocarbon gases and fluids.

Resistivity, density, and porosity logs have proven to be particularly useful for determining the location of hydrocarbon gases and fluids. These logs are "open hole" logs, i.e., log measurements that are taken before the formation face is sealed with tubular steel casing. The present application focuses on a new way to measure density without reliance on a radioactive source.

Density is traditionally measured by determining the scattering and absorption of gamma rays emitted from a gamma ray source. Traditionally, density logging tools employ Cesium 137, although other sources such as Americium 241 can also be used. Radioactive sources present certain risks to human health and could potentially be a primary ingredient in weapons of terrorism. Even in routine field operations, oilfield workers encounter radiation exposure risks from the use of these sources. When exposed to sufficient radiation from such sources, humans experience cellular damage that can cause cancer and (at higher doses) radiation sickness. These adverse health effects are often lethal. The source materials described above have long half-lives (30 years for cesium 137, and 5300 years for americium 241), meaning that the radiation from these sources will persist for a very long time if they should be accidentally or intentionally dispersed into the environment.

It should come as no surprise, then, to discover that the government heavily regulates the possession and transportation of radioactive sources. See, e.g., 10 CFR Part 1-Part 1060 (regulations from the NRC and DOE) and Federal Register vol. 70, no. 44, Jul. 28, 2005 (Proposed rule changes to 10 CFR Parts 20, 32, and 150, concerning the NRC National Source Tracking Database). Such regulations impose considerable costs for establishing and maintaining compliance. Despite such regulations, the authors are given to understand that on average, at least one such radioactive source is misplaced or stolen each year. See, e.g., Russell Gold and Robert Block, "Radioactive Material Is Stolen From Halliburton", Mar. 6, 2003 (discussing the theft of a radioactive source and the dangers of a dirty bomb).

In addition, extensive safety procedures are needed to protect workers who transport, store, and use radioactive sources. Radiation from such sources can produce heat, ionization, and chemical changes which lead to corrosion of storage containers. Regular "wipe" tests are conducted to monitor sources for leakage, radiation sensors are put into storage facilities to monitor radiation levels, and employees are given radiation-sensitive badges to monitor employee exposure levels. Cumulatively, the tests, monitoring equipment, transportation, and storage facilities present a severe budgetary impact to any company that employs such sources.

Moreover, when compliance efforts are combined with necessary safety procedures, the result is a considerable effort and delay in getting a radioactive source to the location in the field where it is needed. To further compound the problem, the preferred radioactive sources are in short supply. The largest supplier of americium 241 was the US Department of Energy, which had accumulated a stockpile of this material from various refining operations on other radioactive materials. These stockpiles have now been exhausted, and currently the only continuing source of this material is an aging breeder reactor in eastern Europe.

BRIEF DESCRIPTION OF THE DRAWINGS

An understanding of the disclosed embodiments can be obtained when the following detailed description is considered in conjunction with the drawings, in which:

FIG. 7 is a flowchart of an illustrative acoustic density logging method;

FIG. 8 shows an illustrative system for implementing methods disclosed herein.

Figure 1:
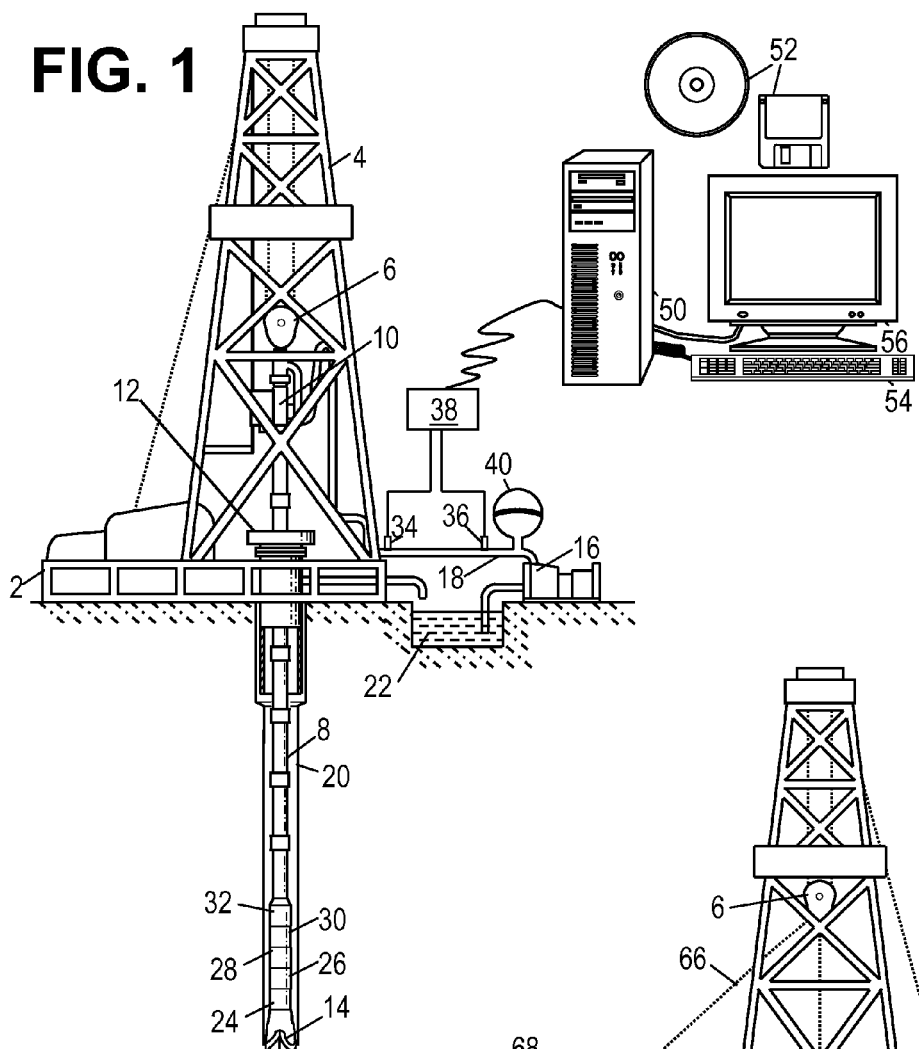
FIG. 1 is an illustrative view of a logging-while-drilling (LWD) environment.

While the invention is susceptible to various modifications and alternative forms, specific embodiments thereof are shown by way of example in the drawings and will herein be described in detail. It should be understood, however, that the drawings and detailed description thereof are not intended to limit the invention to the particular form disclosed, but on the contrary, the intention is to cover all modifications, equivalents and alternatives falling within the scope of the appended claims.

DETAILED DESCRIPTION

The issues identified in the background are at least partly addressed by the disclosed systems and methods for obtaining formation density logs from acoustic logging measurements. The techniques disclosed herein do not require a radioactive source and in fact they may offer better precision particularly in rugose boreholes. In at least some embodiments, disclosed techniques exploit an observed relationship between a transmission coefficient $T(\rho_b, V_C, \rho_m V_m)$ and a breakdown resistance $\mu B(\rho_b, V_C, V_S)$ to enable determination of the formation density $\rho_b$ from measurements of the formation's compressional wave velocity $V_C$, the formation's shear wave velocity $V_S$, and the borehole fluid's acoustic impedance $\rho_M V_M$. The desired measurements can be acquired by attaching or integrating a fluid cell with an acoustic logging tool that measures acoustic wave propagation velocities. Real-time density logs can be obtained from both wireline and logging-while-drilling implementations.

Some logging apparatus embodiments include an acoustic logging tool, a fluid cell, and a processor. The acoustic logging tool obtains propagation measurements representative of compressional wave velocity and shear wave velocity in a formation proximate to a borehole. The fluid cell obtains measurements representative of an acoustic impedance of the borehole fluid. The processor calculates formation density values based at least in part on said propagation measurements and said fluid measurements, and associates the density values with the location of the measurements to provide a formation density log. The processor can be part of the downhole tool or part of the surface processing facility.

At least some of the disclosed methods can be embodied as software on an information storage medium. Such software may include modules to retrieve logging data from an acoustic logging tool; to combine said logging data with acoustic impedance measurements to generate a formation density log; and to put the log in perceptible form, e.g., by printing or displaying it. In some cases the acoustic impedance is determined from measurements by a fluid cell integrated with the acoustic logging tool. In other cases, the acoustic impedance is estimated from whatever data is available.

The disclosed embodiments can be best understood in the context of their environment. Accordingly, FIG. 1 shows an illustrative logging while drilling (LWD) environment. A drilling platform 2 is equipped with a derrick 4 that supports a hoist 6. Rig operators drill oil and gas wells using a string of drill pipes 8. The hoist 6 suspends a top drive 10 that is used to rotate the drill string 8 and to lower the drill string through the wellhead 12. Connected to the lower end of the drill string 8 is a drill bit 14. The bit 14 is rotated and drilling accomplished by rotating the drill string 8, by use of a downhole motor near the drill bit, or by both methods. Mud recirculation equipment 16 pumps drilling fluid through supply pipe 18, through top drive 10, and down through the drill string 8 at high pressures and volumes to emerge through nozzles or jets in the drill bit 14. The mud then travels back up the hole via the annulus formed between the exterior of the drill string 8 and the borehole wall 20, through a blowout preventer, and into a mud pit 24 on the surface. On the surface, the drilling mud is cleaned and then recirculated by recirculation equipment 16. The drilling mud cools the drill bit 14, carries cuttings from the base of the bore to the surface, and balances the hydrostatic pressure in the rock formations.

The bottomhole assembly (i.e., the lowermost part of drill string 8) includes thick-walled tubulars called drill collars to add weight and rigidity to aid the drilling process. The thick walls of these drill collars make them useful for housing instrumentation and LWD sensors. Thus, for example, the bottomhole assembly of FIG. 1 includes a natural gamma ray detector 24, a resistivity tool 26, a density tool 28, a porosity tool 30, and a control & telemetry module 32. Other tools and sensors can also be included in the bottomhole assembly, including position sensors, orientation sensors, pressure sensors, temperature sensors, vibration sensors, etc. From the various bottomhole assembly sensors, the control and telemetry module 32 collects data regarding the formation properties and/or various drilling parameters, and stores the data in internal memory. In addition, some or all of the data is transmitted to the surface by, e.g., mud pulse telemetry.

Telemetry module 32 modulates a resistance to drilling fluid flow to generate pressure pulses that propagate to the surface. One or more pressure transducers 34, 36 (isolated from the noise of the mud pump 16 by a desurger 40) convert the pressure signal into electrical signal(s) for a signal digitizer 38. The digitizer 38 supplies a digital form of the pressure signals to a computer 50 or some other form of a data processing device. Computer 50 operates in accordance with software (which may be stored on information storage media 52) and user input received via an input device 54 to process and decode the received signals. The resulting telemetry data may be further analyzed and processed by computer 50 to generate a display of useful information on a computer monitor 56 or some other form of a display device. For example, a driller could employ this system to obtain and view an acoustic density log.

Figure 2:
FIG. 2 is an illustrative view of a wireline logging environment.

At various times during the drilling process, the drill string 8 may be removed from the borehole as shown in FIG. 2. Once the drill string has been removed, logging operations can be conducted using a wireline logging tool 62, i.e., a sensing instrument sonde suspended by a cable 66 having conductors for transporting power to the tool and telemetry from the tool to the surface. The wireline tool assembly can include an acoustic density logging tool similar to the LWD embodiment described hereinbelow. Other formation property sensors can additionally or alternatively be included to measure formation properties as the tool is pulled uphole. A logging facility 68 collects measurements from the logging tool 62, and includes computing facilities for processing and storing the measurements gathered by the logging tool.

Figure 3:
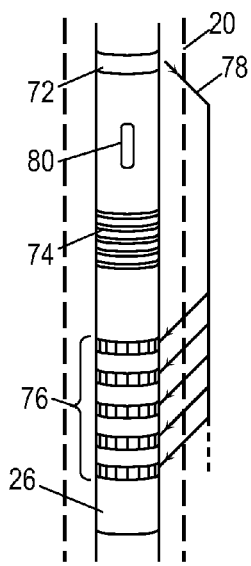
FIG. 3 shows an illustrative acoustic density logging tool.

FIG. 3 shows an illustrative LWD embodiment of acoustic logging tool 26 in a borehole 16. The logging tool 26 includes an acoustic source 72, an acoustic isolator 74, an array of acoustic receivers 76, and a fluid cell 80. The source 72 may be a monopole, dipole, quadrupole, or higher-order multipole transmitter. Some tool embodiments may include multiple acoustic sources or one acoustic source that is configurable to generate different wave modes, but in each case the source is designed to generate acoustic waves 78 that propagate through the formation and are detected by the receiver array 76. The acoustic source may be made up of piezoelectric elements, bender bars, or other transducers suitable for generating acoustic waves in downhole conditions. The contemplated operating frequencies for the acoustic logging tool are in the range between 0.5 kHz and 30 kHz, inclusive. The operating frequency may be selected on the basis of a tradeoff between attenuation and wavelength in which the wavelength is minimized subject to requirements for limited attenuation. Subject to the attenuation limits on performance, smaller wavelengths may offer improved spatial resolution of the tool.

The acoustic isolator 74 serves to attenuate and delay acoustic waves that propagate through the body of the tool from the source 72 to the receiver array 76. Any standard acoustic isolator may be used. Receiver array 76 can include multiple sectorized receivers spaced apart along the axis of the tool. Although five receivers are shown in FIG. 3, the number can vary from one to sixteen or more.

When the acoustic logging tool is enabled, the internal controller controls the triggering and timing of the acoustic source 72, and records and processes the signals from the receiver array 76. The internal controller fires the acoustic source 72 periodically, producing acoustic pressure waves that propagate through the fluid in borehole 20 and into the surrounding formation. As these pressure waves propagate past the receiver array 76, they cause pressure variations that can be detected by the receiver array elements.

Figure 4:
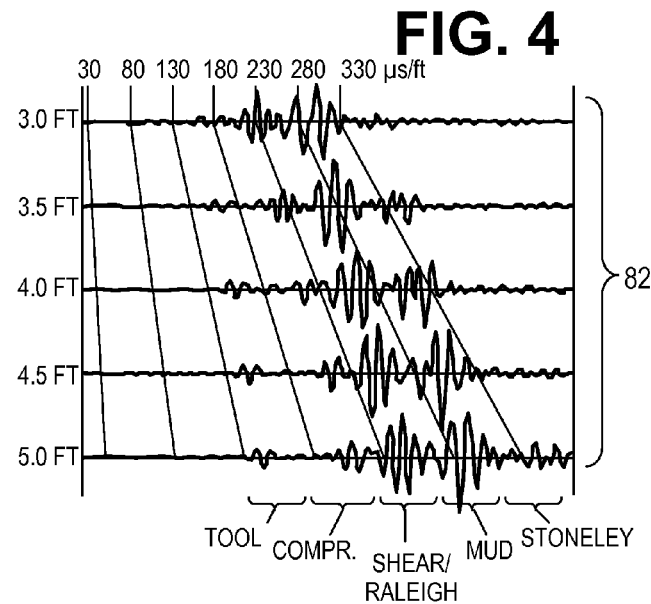
FIG. 4 shows illustrative receive waveforms from which acoustic wave velocities can be measured.

FIG. 4 shows a set of illustrative amplitude versus time waveforms 82 detected by the receiver array 76 in response to one triggering of the source 72. The receivers are located at 3, 3.5, 4, 4.5, and 5 ft from the acoustic source, and various slowness value slopes are shown to aid interpretation. The time scale is from 68 to 1832 μs. Each of the waveforms is shown for a corresponding receiver as a function of time since the transmitter firing. (Note the increased time delay before the acoustic waves reach the increasingly distant receivers.) After recording the waveforms, the internal controller typically normalizes the waveform so that they have the same signal energy.

The detected waveforms represent multiple waves, including waves propagating through the body of the tool ("tool waves"), compression waves from the formation, shear waves from the formation, waves propagating through the borehole fluid ("mud waves"), and Stoneley waves propagating along the borehole wall. Each wave type has a different propagation velocity which separates them from each other and enables their velocities to be independently measured using, e.g., the semblance processing techniques disclosed by B. Mandal, U.S. Pat. No. 7,099,810 "Acoustic logging tool having a quadrupole source".

The receiver array signals may be processed by a downhole controller to determine $V_S$ (the formation shear wave velocity) and $V_C$ (the formation compression wave velocity), or the signals may be communicated to the uphole computer system for processing. The measurements are associated with borehole position (and possibly tool orientation) to generate a log or image of the acoustical properties of the borehole. The log or image is stored and ultimately displayed for viewing by a user.

Returning to FIG. 3, the illustrative acoustic logging tool 26 includes a fluid cell 80 to measure acoustic properties of the borehole fluid. Specifically, the fluid cell measures $V_M$, the velocity of compression waves in the borehole fluid and $\rho_m$, the density of the borehole fluid. (Alternatively, the acoustic impedance $Z_M = \rho_m V_M$ can be measured.) Various suitable fluid cells exist in the art, such as e.g., the fluid cell employed by the Halliburton CAST-V™ wireline tool, or that disclosed by B. Mandal, U.S. Pat. No. 6,957,700 "Self-calibrated ultrasonic method of in-situ measurement of borehole fluid acoustic properties". The fluid cell 80 can be operated in a manner that avoids interference from firings of the source 72, e.g., the borehole fluid property measurements can be made while the source 72 is quiet, and the formation wave velocity measurements can be made while the fluid cell is quiet.

Figure 5:
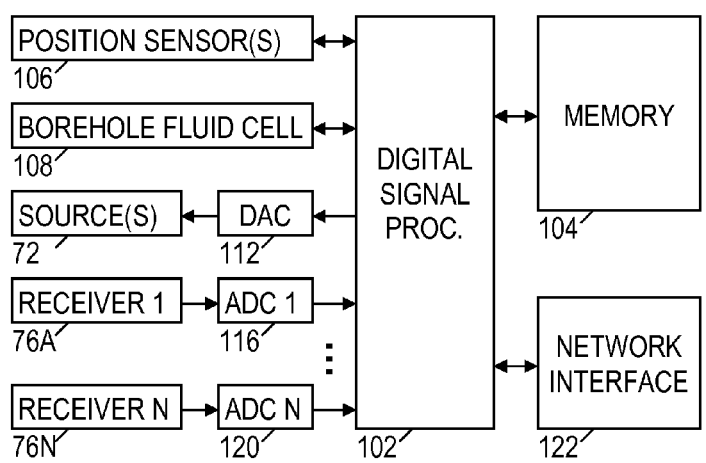
FIG. 5 is a functional block diagram of illustrative tool electronics.

FIG. 5 is a functional block diagram of the illustrative acoustic logging tool 26. A digital signal processor 102 operates as an internal controller for tool 26 by executing software stored in memory 104. The software configures the processor 102 to collect measurements from various measurement modules such as position sensor 106 and fluid cell 108. (Note that these modules can alternatively be implemented as separate tools in a wireline sonde or bottomhole assembly, in which case such measurements would be gathered by a control/telemetry module.)

The software further configures the processor 102 to fire the source(s) 72 via a digital to analog converter 112, and further configures the processor 102 to obtain receive waveforms from receiver array 76 via analog to digital converters 116-120. The digitized waveforms can be stored in memory 104 and/or processed to determine compression and shear wave velocities. As explained further below, the processor can combine the compression and shear wave velocities with measurements of drilling fluid velocity and density to obtain an estimate of formation density. Alternatively, these measurements can be communicated to a control module or a surface processing facility to be combined there. In either case, the formation density estimates are associated with the position of the logging tool to provide a density log. A network interface 122 connects the acoustic logging tool to a control/telemetry module via a tool bus, thereby enabling the processor 102 to communicate information to the surface (e.g., velocity measurements or density logs) and to receive commands from the surface (e.g., activating the tool or changing its operating parameters).

Given the foregoing context, we now turn to a discussion of two physical parameters. The first parameter is the transmission coefficient T, which is the fraction of acoustic wave energy that passes through the interface between the borehole fluid and the formation. (A related parameter is the reflection coefficient R, which is the fraction of acoustic wave energy reflected from the interface. The two coefficients R and T sum to unity.) The transmission coefficient can be expressed as:

$$T = \frac{2\rho_m V_m}{\rho_b V_C + \rho_m V_m} \quad (1)$$

where $\rho_M$ is the density of the borehole fluid ("mud"), $V_M$ is the acoustic velocity of the borehole fluid, where $\rho_b$ is the bulk density of the formation, and $V_C$ is the acoustic velocity of compressional waves in the formation.

The second parameter is breakdown resistance, i.e., the product of Shear Modulus and Bulk Modulus. Shear modulus $\mu$ and Bulk modulus B can be expressed in the following forms:

$$\mu = \rho_b V_S^2 \quad (2)$$

$$B = \rho_b (V_C^2 - 4/3 V_S^2) \quad (3)$$

where $\rho_b$ is the bulk density of the formation, $V_C$ is the acoustic velocity of compressional waves in the formation, and $V_S$ is the acoustic velocity of shear waves in the formation. Their product is a measure of the resistance of the rock to breakdown and/or sand out:

$$\mu B = \rho_b^2 (V_C^2 V_S^2 - 4/3 V_S^4) \quad (4)$$

The inventors have discovered that there is a strong correlation between the logarithm of the transmission coefficient and the logarithm of the breakdown resistance:

$$\ln(T) \approx \alpha_0 + \alpha_1 \ln(\mu B) \quad (5)$$

where $\alpha_i$ are coefficients that are determined empirically during a calibration process. Support for this correlation can be found in the underlying physics since both the transmission coefficient T and the breakdown resistance $\mu B$ are in some sense measures of a material's compliancy to pressure waves.

Figure 6:
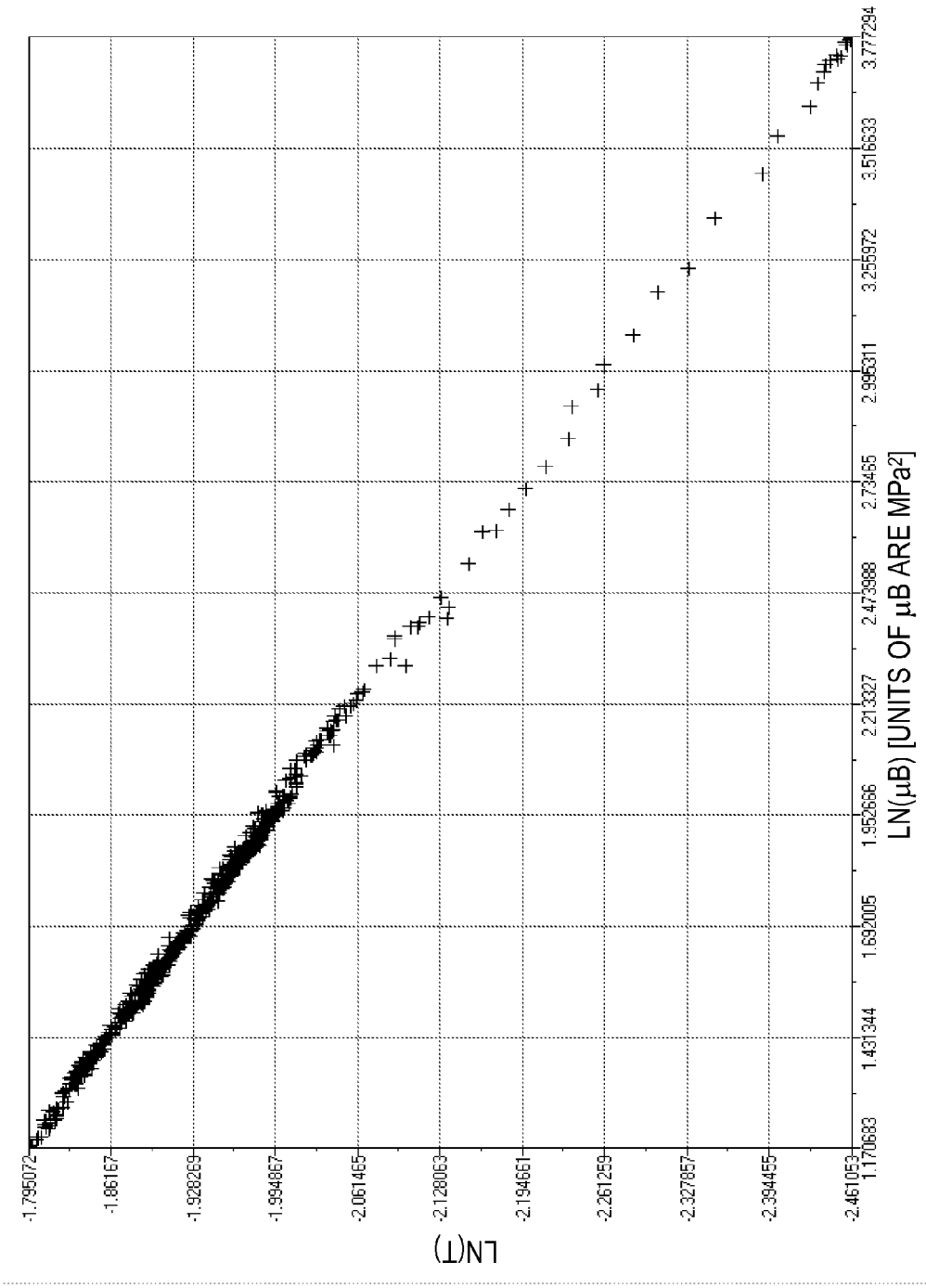
FIG. 6 shows a correlation between breakdown strength and acoustic transmission coefficient.

FIG. 6 is a graph derived from actual logging data using assumed values for borehole fluid properties which were not independently measured. Nevertheless, FIG. 6 illustrates the strong correlation between the transmission coefficient T and the breakdown resistance $\mu B$. The equation coefficients $\alpha_i$ might vary for different borehole fluids, but measurements suggest that they are independent of borehole size and tool geometry. For greater precision, equation (5) can be expressed as a second or higher order relationship, e.g.:

$$\ln(T) = \alpha_0 + \alpha_1 \ln(\mu B) + \alpha_2 (\ln(\mu B))^2 + \quad (6)$$

When expanded using equations (1) and (4), equation (6) becomes:

$$\ln\left(\frac{2\rho_m V_m}{\rho_b V_C + \rho_m V_m}\right) = \quad (7)$$
$$a_0 + a_1 \ln\left(\rho_b^2 \left(V_C^2 V_S^2 - \frac{4}{3} V_S^4\right)\right) + a_2 \left[\ln\left(\rho_b^2 \left(V_C^2 V_S^2 - \frac{4}{3} V_S^4\right)\right)\right]^2 + \ldots$$

In one experiment, the coefficients for a range of transmission coefficients between about 0.15 and 0.85 and were found to be $\alpha_0 = -0.8513$, $\alpha_1 = -0.2203$, $\alpha_2 = -0.009$, and $\alpha_3 = 0.0009$.

Inspection of equation (7) reveals that when the logging tool is designed to measure compressional and shear wave velocities of the formation as well as density and acoustic velocity of the borehole fluid, the only remaining unknown is the bulk density of the formation. In other words, equation (7) can be rewritten in the form:

$$F(\rho_b, \rho_m, V_m, V_C, V_S) = 0 \quad (8)$$

in which the formation density is the only unknown, enabling it to be determined using standard numerical computation techniques.

FIG. 7 is a flowchart of an illustrative bulk density logging method that employs this principle. It is assumed that the equation coefficients $\alpha_i$ have been previously determined during calibration of the tool, although this is not required. Beginning in block 202, the position of the logging tool along the borehole is determined. Where the tool provides azimuthal sensitivity, the position determination includes a determination of the tool's rotational orientation. In block 204, the acoustical properties of the borehole fluid are measured using a fluid cell. The measured properties include the acoustic impedance of the borehole fluid, or alternatively the density of the fluid and the propagation velocity of acoustic waves through the fluid. In block 206, the logging tool measures the propagation velocities of shear waves and compressional waves through the formation and associates them with the current tool position. Some acoustic logging tools enable these measurements to be azimuthally sensitive, so that such measurements are made at multiple positions around the circumference of the borehole.

In block 208, the acoustic measurements for the borehole fluid and the formation are combined to calculate the formation density for the current tool position, and the process repeats beginning with block 202. In block 210, the density calculations are accumulated and made available in perceptible form to a user as a log of density versus position.

The functions described in FIG. 7 can be distributed throughout the logging system or concentrated within the internal processor for the logging tool. Thus, for example, the position measurements, fluid measurements, and formation wave velocity measurements can be made by separate tools and communicated to a separate processing facility where the density calculation is performed. Moreover, the functions can be carried out in a parallel or asynchronous fashion even though they are described for explanatory purposes as occurring in a sequential order.

FIG. 8 is a block diagram of an illustrative surface processing system suitable for collecting, processing, and displaying logging data. In some embodiments, a user may further interact with the system to send command to the bottom hole assembly to adjust its operation in response to the received data. The system of FIG. 8 can take the form of a computer that includes a chassis 50, a display 56, and one or more input devices 54A, 54B. Located in the chassis 50 is a display interface 802, a peripheral interface 804, a bus 806, a processor 808, a memory 810, an information storage device 812, and a network interface 814. Bus 806 interconnects the various elements of the computer and transports their communications.

In at least some embodiments, the surface telemetry transducers are coupled to the processing system via a data acquisition unit 38 and the network interface 814 to enable the system to communicate with the bottom hole assembly. In accordance with user input received via peripheral interface 804 and program instructions from memory 810 and/or information storage device 812, the processor processes the received telemetry information received via network interface 814 to construct formation property logs and display them to the user.

The processor 808, and hence the system as a whole, generally operates in accordance with one or more programs stored on an information storage medium (e.g., in information storage device 812 or removable information storage media 52). Similarly, the bottom hole assembly control module and/or acoustic logging tool controller 102 operates in accordance with one or more programs stored in an internal memory. One or more of these programs configures the tool controller, the bottomhole assembly control module, and the surface processing system to individually or collectively carry out at least one of the density logging methods disclosed herein.

Figure 9:
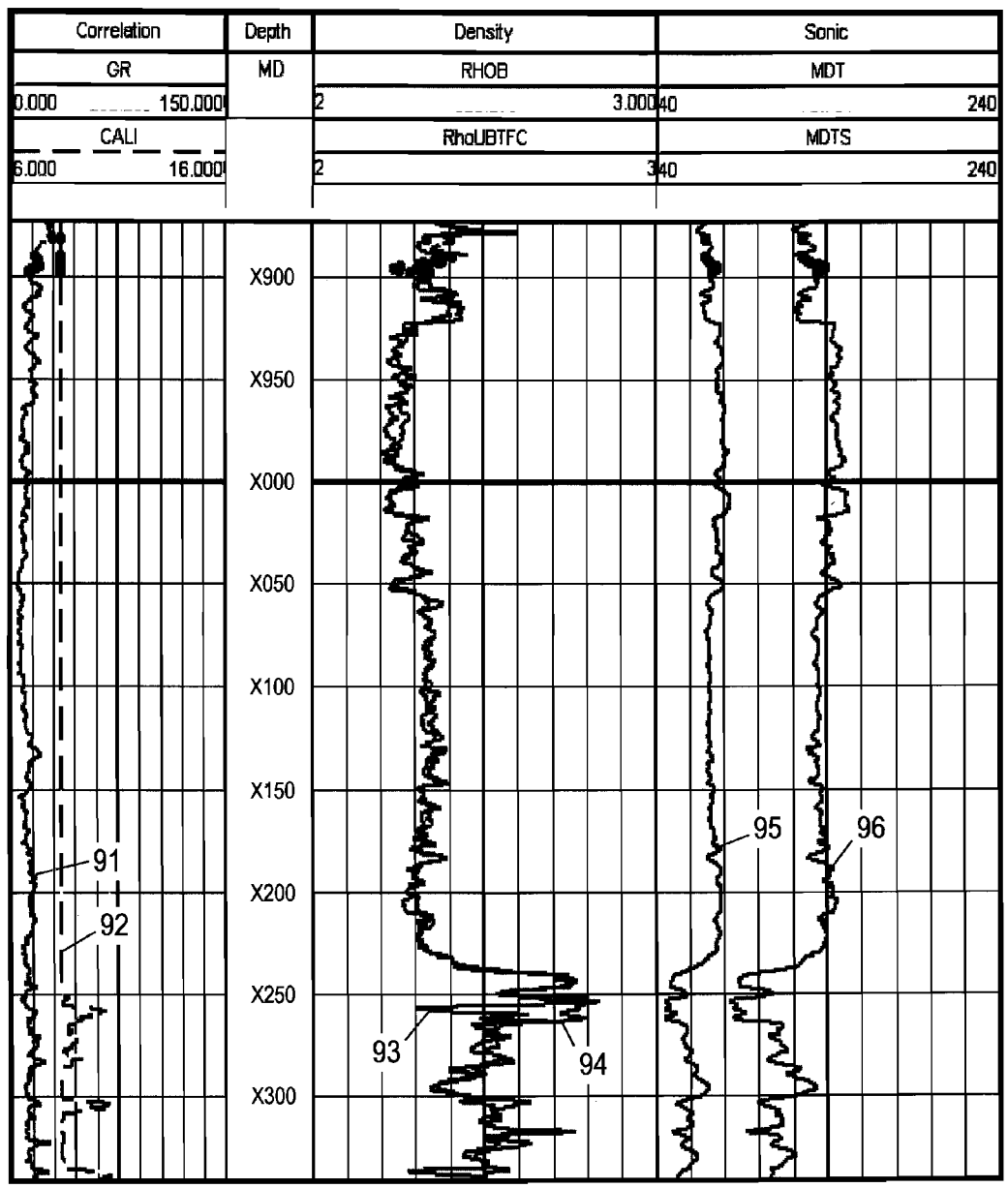
FIG. 9 shows an illustrative log chart that compares acoustic density with gamma density measurements.

FIG. 9 shows an illustrative log chart that includes a natural radioactivity (gamma ray) log 91, a caliper log 92, a neutron density log 93, an acoustic density log 94, a compressional wave velocity log 95, and a shear wave velocity log 96 for a well interval between about X880 and X330 feet. The gamma ray log 91 is a routine log which is not relevant to the present discussion. The caliper log 92 measures the borehole diameter. The scale ranges from 6 inches to 16 inches. For most of the range shown, the borehole diameter is 8.25 inches, but the region below X250 feet reveals some irregularities and washouts where the diameter increases up to about 10.5 inches.

Skipping over to the right, the velocity logs 95, 96 are logs of acoustic slowness in units of microseconds per foot. (Technically, slowness is the inverse of velocity, but slowness and velocity are terms that are often used interchangeably.) The slowness scale ranges from 40 microseconds/foot to 240 microseconds per foot. The compression wave slowness varies between 60 and 80 microseconds/foot above about X230 feet and falls to between about 40 and 60 microseconds per foot below that depth. The shear wave slowness starts at around 120 microseconds/foot, increases to about 140 microseconds per foot over the interval X920-X230, and then varies between 80 and 120 microseconds/foot.

Log 93 shows the formation density measured by a neutron logging tool on a scale between 2 and 3 g/cm³. Log 94 shows the formation density calculated based on the wave velocity measurements with assumed values for the acoustic properties of the borehole fluid. The two density logs 93, 94 are very close (indeed, they overlap for most of the chart), except that significant deviations are observed in those regions where the borehole diameter departs from the nominal 8.25 inches. The neutron density log is known to be unreliable in rugose boreholes, so these deviations are attributed to inaccuracies of the neutron density log.

Thus the disclosed acoustic density logging systems and methods obviate any need of a radioactive source for density logging, and potentially offer improved accuracy due to their insensitivity to borehole rugosity. Moreover, the disclosed acoustic logging tools may not need to be tailored for use with different borehole diameters, but rather a single tool may be suitable for use in boreholes of many diameters.

In a different variation of the disclosed methods, the acoustic density log is determined from existing logs of acoustic wave velocities, using estimates of the acoustic properties of the borehole fluids. Where necessary, neural networks can be used to estimate equation coefficients or as a substitute model for calculating density from sonic data logs. The training data for such neural networks can come from wells having both sonic logs and neutron density logs.

Numerous variations and modifications will become apparent to those skilled in the art once the above disclosure is fully appreciated. For example, the logging tools described herein can be implemented as logging while drilling tools and as wireline logging tools. The wave velocities can be measured as slowness values or propagation delays. It is intended that the following claims be interpreted to embrace all such variations and modifications.

What is claimed is:

1. A logging apparatus that comprises:
    an acoustic logging tool that obtains propagation measurements representative of compressional wave velocity and shear wave velocity in a formation proximate to a borehole;
    a fluid cell that obtains fluid measurements representative of an acoustic impedance of fluid in said borehole; and
    a processor that calculates formation density values based at least in part on said propagation measurements and said fluid measurements, said formation density values being associated with a tool position during said propagation measurements to form a formation density log.

2. The apparatus of claim 1, wherein said processor is part of a surface processing facility having software that configures the facility to present said formation density log in visible form.

3. The apparatus of claim 1, wherein said processor is part of a wireline logging sonde, wherein said processor communicates the formation density values to a surface processing facility, and wherein said surface processing facility generates a display of logging data based at least in part on said formation density values.

4. The apparatus of claim 1, wherein said processor is a part of a logging while drilling assembly, wherein said processor communicates the formation density values to a surface processing facility, and wherein said surface processing facility generates a display of logging data based at least in part on said formation density values.

5. The apparatus of claim 1, wherein the propagation measurements are compressional wave slowness and shear wave slowness.

6. The apparatus of claim 1, wherein the fluid measurements are fluid density and acoustic wave propagation velocity.

7. The apparatus of claim 1, wherein said formation density values are solutions to an equation relating a transmission coefficient $T(\rho_b, V_C, \rho_m V_m)$ to a breakdown resistance $\mu B(\rho_b, V_C, V_S)$, where $\rho_b$ is the formation density, $V_C$ is the compressional wave velocity, $\rho_M V_M$ is the fluid's acoustic impedance, and $V_S$ is the shear wave velocity.

8. A density logging method that comprises:
    obtaining measurements of propagation times for compressional and shear waves in a borehole wall;
    processing the propagation times together with a borehole fluid impedance to determine a formation density;
    associating the formation density with measurement location to form a density log; and
    putting the density log in a perceptible form.

9. The method of claim 8, further comprising acquiring acoustic property measurements of the borehole fluid made contemporaneously with the measurements of propagation times.

10. The method of claim 8, wherein said borehole fluid impedance is an estimate.

11. The method of claim 8, wherein said processing is performed with a neural network that has been trained to convert acoustic wave propagation measurements and fluid impedance values to neutron density logging data.

12. The method of claim 8, wherein said processing includes determining compressional and shear wave slowness values.

13. The method of claim 8, wherein said processing includes determining compressional and shear wave velocities.

14. The method of claim 8, wherein said processing includes determining a solution to an equation relating a transmission coefficient $T(\rho_b, \nabla t_C, Z_m)$ to a breakdown resistance $\mu B(\rho_b, \nabla t_C, \nabla t_S)$, where $\rho_b$ is the formation density, $\nabla t_C$ is the compressional wave propagation time, $Z_M$ is the fluid's acoustic impedance, and $\nabla t_S$ is the shear wave propagation time.

15. An information storage medium containing software comprising:
    a read module that retrieves logs gathered by an acoustic logging tool;
    a processing module that combines said logs with one or more borehole fluid acoustic impedance values to generate a formation density log; and
    an output module that provides a perceptible representation of values in the formation density log.

16. The medium of claim 15, wherein said logs represent compressional and shear wave velocities measured by the acoustic logging tool.

17. The medium of claim 16, wherein said borehole fluid acoustic impedance values are determined from measurements of a fluid cell attached to said acoustic logging tool.

18. The medium of claim 17, wherein said processing module determines formation density values in accordance with an equation that relates a transmission coefficient $T(\rho_b, V_C, \rho_m V_m)$ to a breakdown resistance $\mu B(\rho_b, V_C, V_S)$, where $\rho_b$ is the formation density, $V_C$ is the compressional wave velocity, $\rho_M V_M$ is the fluid's acoustic impedance, and $V_S$ is the shear wave velocity.

* * * * *